US012789693B2

(12) United States Patent
French

(10) Patent No.: US 12,789,693 B2
(45) Date of Patent: Nov. 10, 2026

(54) ONE-PIECE COMPOSITE TRAILER

(71) Applicant: Stephen Michael French Holdings, Inc., Stuart, FL (US)

(72) Inventor: Stephen M. French, Stuart, FL (US)

(73) Assignee: Stephen Michael French Holdings, Inc., Jupiter, FL (US)

( * ) Notice: Subject to any disclaimer, the term of this patent is extended or adjusted under 35 U.S.C. 154(b) by 296 days.

(21) Appl. No.: 18/761,939

(22) Filed: Jul. 2, 2024

(65) Prior Publication Data

US 2025/0026258 A1 Jan. 23, 2025

Related U.S. Application Data

(63) Continuation-in-part of application No. 18/529,545, filed on Dec. 5, 2023, now abandoned, which is a continuation of application No. 17/096,370, filed on Nov. 12, 2020, now Pat. No. 11,865,961.

(60) Provisional application No. 62/934,912, filed on Nov. 13, 2019.

(51) Int. Cl.
*B60P 3/10* (2006.01)

(52) U.S. Cl.
CPC ............. *B60P 3/1066* (2013.01); *B60P 3/105* (2013.01); *B60P 3/1075* (2013.01)

(58) Field of Classification Search
CPC ....... B62D 29/041; B60P 3/1058; B60P 3/105
See application file for complete search history.

(56) References Cited

U.S. PATENT DOCUMENTS

| | | | | | |
|---|---|---|---|---|---|
| 5,429,383 | A * | 7/1995 | Reed | B60P 3/1066 414/529 |
| 7,810,830 | B2 * | 10/2010 | Warren | B60P 3/1066 114/344 |
| 7,828,329 | B2 | 11/2010 | Biscan | |
| 8,235,421 | B2 * | 8/2012 | Biscan | E04B 1/34352 280/789 |
| 2021/0031668 | A1 * | 2/2021 | French | B62D 21/20 |
| 2021/0138951 | A1 * | 5/2021 | French | B62D 63/062 |

* cited by examiner

*Primary Examiner* — Minnah L Seoh
*Assistant Examiner* — Hosam Shabara
(74) *Attorney, Agent, or Firm* — McHale & Slavin, P.A.

(57) ABSTRACT

A boat trailer constructed from a polymer composition that eliminates rust and corrosion commonplace in steel or aluminum trailers used in salt water or over salted roads. The trailer employs a support plate that reinforces an inner and outer wall forming a one piece construction that includes a matrix of support walls that can be scaled to accommodate large boats.

17 Claims, 13 Drawing Sheets

ONE-PIECE COMPOSITE TRAILER

PRIORITY CLAIM

In accordance with 37 C.F.R. § 1.76, a claim of priority is included in an Application Data Sheet filed concurrently herewith. Accordingly, the present invention claims priority as a continuation-in-part of U.S. patent application Ser. No. 18/529,545 entitled "ONE-PIECE COMPOSITE TRAILER", filed Dec. 5, 2023, which claims priority as a continuation of U.S. patent application Ser. No. 17/096,370 entitled "ONE-PIECE COMPOSITE TRAILER", filed Nov. 12, 2020, which claims priority to U.S. Provisional Patent Application No. 62/934,912, entitled "ONE-PIECE COMPOSITE TRAILER", filed Nov. 13, 2019. The contents of which the above referenced applications are incorporated herein by reference.

FIELD OF THE INVENTION

This invention is related to the field of trailers and, in particular, to a one-piece composite trailer.

BACKGROUND OF THE INVENTION

Trailers are subject to the U.S. Department of Transportation regulations for strength and safety. Typically, a boat trailer consists of side beams coupled together by use of cross members to form a primary structural support. The side beams come together at the front of the trailer, wherein a trailer hitch is positioned for coupling the trailer to a towing vehicle. The side beams include cradle members to support a boat or deck to support other items and suspension systems comprising springs, brackets, axles, wheels, brakes and lights.

Conventional construction of a trailer employs steel or aluminum. Since a boat trailer must be partially submerged for retrieving or launching a boat, a boat trailer constructed of galvanized metal is susceptible to rusting and a boat trailer constructed of anodized aluminum is susceptible to corrosion. This is especially problematic when the trailer is used in a saltwater environment. Additionally trailers that travel over roads that have salt or chemical treatments are susceptible to corrosion.

A trailer that is not used in saltwater typically employs a painted steel structure for the structural support. However, steel frames that are left exposed to the elements can accelerate imperfections in the paint which can metal degradation or rust. Even galvanized steel can quickly develop surface corrosion especially along weld points where the galvanized material is weakest. Powder coated trailers only hide rust that is developing under the surface until the coating flakes off.

High strength corrosion-resistant aluminum alloys is commonly found on trailers used to transport the more expensive boats. An aluminum trailer frame may be welded together, bolted together, or a combination thereof. Aluminum structural members are more expensive than galvanized steel members but retain their appearance longer and provide a lightweight alternative. Aluminum structural members can form different structural shapes and various angles. While aluminum does not rust, aluminum does corrode and usually does so where steel fasteners are used to couple components together. This includes areas where the aluminum has been drilled for receipt of steel fasteners, weld portions, or where the aluminum is clamped together. Once the anodized coating is compromised, corrosion sets in.

A problem with all known prior art steel and aluminum trailers is that rust or corrosion can quickly cause a trailer appearance to deteriorate and can also affect the strength of the trailer and the resale value. While aluminum trailers may maintain a better appearance than steel trailers for a period of time, the corrosion of aluminum is inevitable when used for launching boats in saltwater. The cost of a 35 foot open fishing boat now exceeds $500,000; a 53 foot open fishing boat now exceeds $2,000,000. Despite the costs of the boats they are typically transported on a trailer that will deteriorate long before the boat life is over. Essentially, the modern boats of today are transported on a trailer design that has not significantly changed in over 50 years. If the trailer fails, damage to the boat is very possible. All known trailers made of steel rust, aluminum corrodes and wood bunks rot quickly when used to launch and retrieve such boats in salt water. Since the boats currently outlast the trailers, at some point in time the trailer must be replaced to properly support the boat. Unfortunately, it is not possible to judge the point in time where a rusted frame or corroded component will fail. The average trailer life is less than ten years, and major repairs are typically required within the first five years just to keep the trailer operational. Trailers that are put into saltwater and then left in the parking lot while the boat is out on the water are baking the salt into every crevice causing accelerated galvanic corrosion.

When a boat is pulled behind a vehicle, the loaded boat trailer is subject to large forces that are amplified as the vehicle speed increases. Higher speeds cause bending, compression, torsion and tensile forces on the trailer that can quickly tear apart frame members affected by rust or corrosion. For safety purposes the primary structural support of a metal frame must be over engineered to anticipate such issues so the boat trailer can safely handle all such forces for years.

U.S. Pat. No. 7,828,329 discloses a transport frame formed from a plurality of polymer beams that interconnected to form a frame. The polymer frame member is held together with adhesive.

What is lacking in the art is a one piece trailer of a design that can meet expected loading using an FRP (fiberglass reinforced polymer) or CFRP (carbon fiber reinforced polymer) that cannot rust, corrode or rot.

SUMMARY OF THE INVENTION

Disclosed is a boat trailer specifically designed for use in saltwater or over salted or chemically treated roads having beams, bolts, hangers, fenders, guide poles, and bunks formed from composite materials that cannot rust or corrode. The boat trailer employs a manufacturing technique that reinforces all beams to distribute forces anticipated during the movement of a boat on the trailer at highway speeds.

An objective of the instant invention is to provide a composite trailer that will last as long as the boat it is designed to carry, and will not degrade from use in saltwater.

Another objective of the instant invention is to provide a composite trailer constructed from either open molding techniques or an infusion technology that draws plastic resin into fabrics, such as carbon fiber and fiberglass, under a vacuum bag.

An objective of the instant invention is to provide a composite trailer having interchangeable attachments to allow for multi-purpose use.

Another objective of the instant invention is to provide a composite trailer wherein beams, bolts, hangers, fenders, guide poles, and bunks are formed from composite materials that cannot rust or corrode.

Still another objective is to provide a trailer with integrated bunks.

Another objective of the invention is to teach the use of one-piece trailers so as to eliminate the need for fasteners known to cause corrosion.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
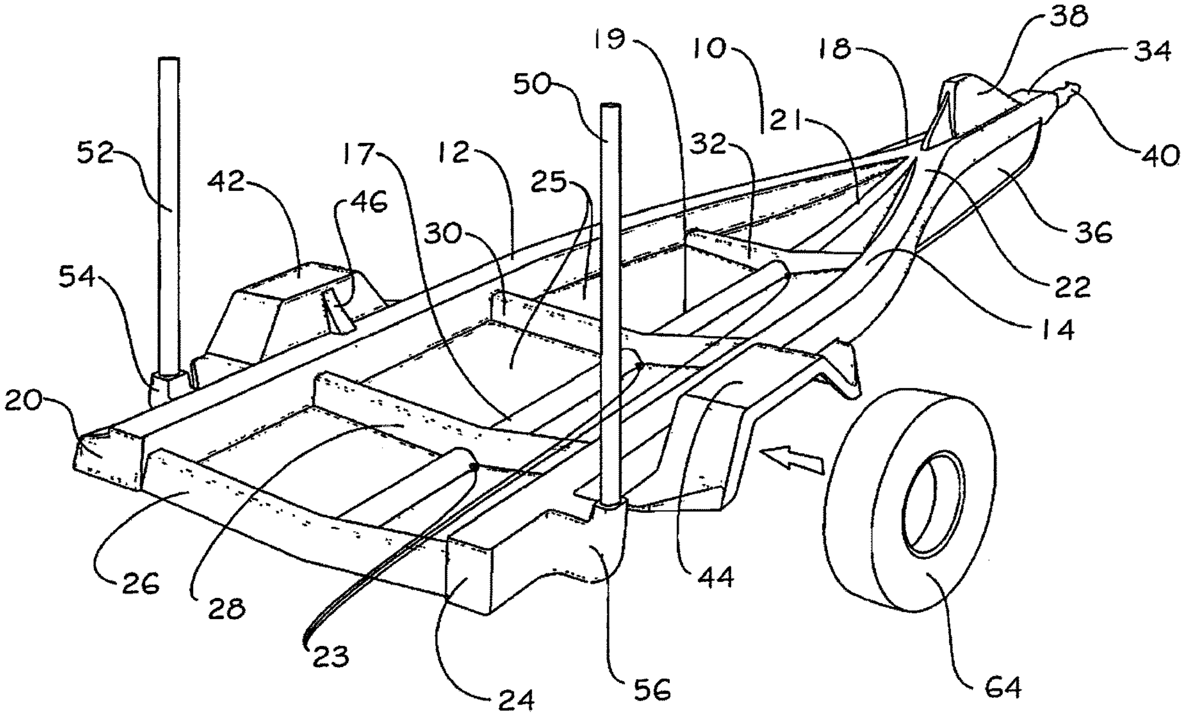
FIG. 1 is a perspective view of a one piece composite boat trailer.
Figure 2:
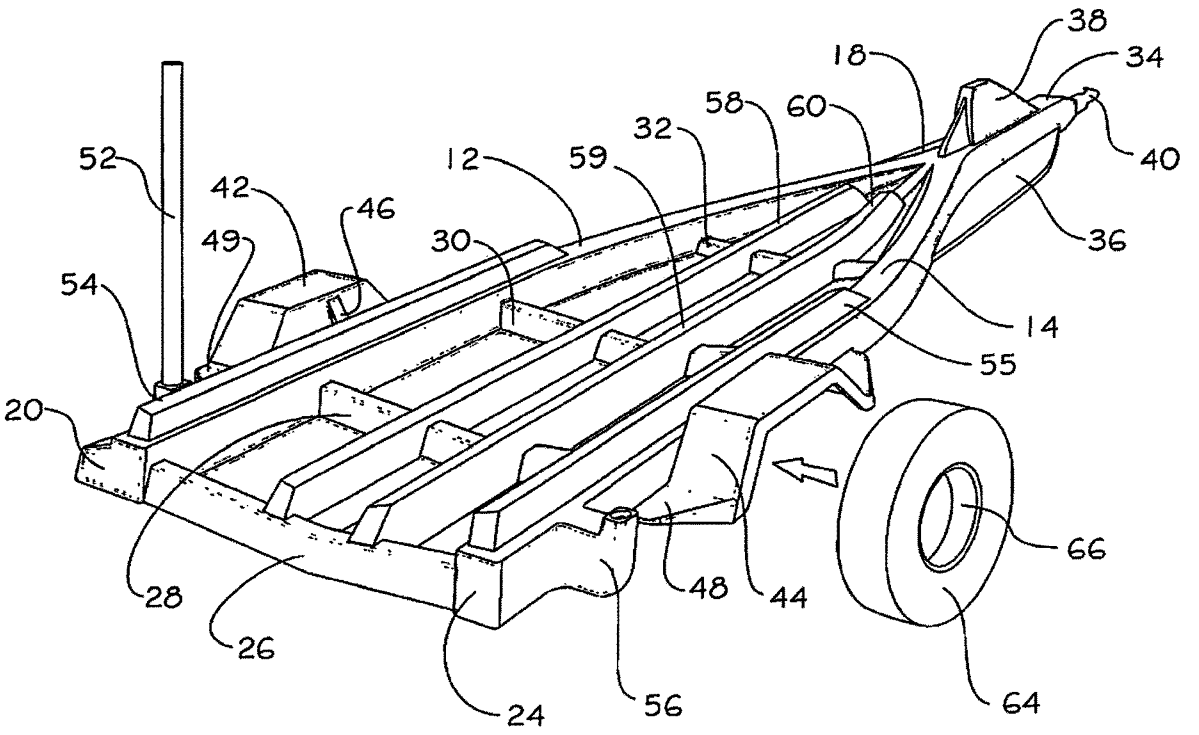
FIG. 2 is a perspective view of a small boat composite boat trailer with bunks.

Referring to FIGS. 1-2, illustrated is a boat trailer 10 formed from composite materials. The boat trailer is formed from a first beam 12 spaced apart from a second beam 14. The beams are constructed from FRP (fiberglass reinforced polymer) or CFRP (carbon fiber reinforced polymer) pultruded tube. Pultrusion forms a composite tube by pulling fibers and resin through a heated die. The resulting beam is 75% lighter than steel, and 30% lighter than aluminum for the same strength. The FRP is noncorrosive, nonconductive, easy to repair and easy to paint.

The first beam 12 is defined by a first front end section 18 and a first rear end 20. Similarly, the second beam 14 has a second front end section 22, and a second rear end 24. Between the rear ends 20, 24 is a rear transition section 16 coupling a first cross beam 26 spaced apart from the second cross beam 28. A second transition section 17 coupling the second cross beam 28 to a third cross beam 30. A third transition section 19 coupling the third cross beam 30 to a fourth cross beam 32. A fourth transition section 21 coupling the fourth cross beam 32 to the first and second front end sections 18 and 22. Drain holes 23 are used to inhibit the trapping of water within the transition sections. Panels 25 secure the transition sections allowing smaller sized cross beams yet provide equivalent structural rigidity.

The front of the trailer includes a tongue 34 that is reinforced 36 with a support platform 38 for a winch, not shown. At the end of the tongue 34 is an attachment hitch D.O.T. trailer coupler 40. The trailer includes integrated wheel covers 42, 44. An integrated bracket 46 provides wheel cover reinforcement. The wheel covers include step sections 48, 49 to allow ease of access to a vessel placed on the trailer. Alignment poles 50, 52 are supported by integrated bases 56 to facilitate the loading of a boat onto the trailer. Outer bunks 54 and 55 can be customized to meet the outer curvature of a boat hull, similarly inner bunks 58 and 59 can be customized to meet the inner curvature of a boat hull. By way of example, the tip 60 of the bunks can be curved along the bow of the boat, a procedure that is not possible with common wood bunks. The curvature allows a better distribution of weight across the bunks to reduce flexing of a boat hull during transport which is known to lead to spider cracks in the gelcoat.

Referring to FIGS. 6-9, while the trailer of the instant invention can be made with the methods described above, in a preferred embodiment the frame is molded with a finish on a bottom side. The methods of fabrication can be female or male molded in temporary or permanent style tooling. They may be molded over formers created by 3D printing the desired sizes and features and laminating or vacuum applications of laminates over the forms.

The frame 100 is formed from a continuous outer wall 101 spaced apart from an inner wall 102 by a bottom wall 110 forming a U-shaped front left beam 122, a side left beam 123, a rear beam 124, a right beam 125, and a front right beam 126. The left beam 123, rear beam 124 and right beam forming a substantially rectangular section 133 formed integral with the front left beam 122 and front right beam 126 which form the triangular shaped towing section 135. The inner wall 102 having side walls 103 forming a matrix of structural support members 114 molded in a cross pattern for transfer of stresses between the left and right side beams 123, 125. The outer wall 101, inner wall 102, bottom wall 110 and side walls 103 are molded as a single piece element. A bottom plate 104 encapsulates the beams forming a finished surface beneath the rectangular section and towing section with drain holes 105 to allow water to evacuate from the enclosed spaces. Alternatively, the bottom plate 104 can be eliminated between the matrix of side walls for weight saving. The frame transitions along the frontal section with front left beam 122 and front right beam 126 into a towing point 106 for attachment to a towing vehicle by tapering the spaced apart longitudinal beams formed by the inner and outward walls together to form a single attachment point. Bosses 107 reduces towing stresses adds stiffness to avoid stresses and provides a mounting point for a hitch 116. The one piece composite frame receives a deck 113 constructed and arranged to be attached to the frame. The deck 113 allowing ease of replacement if damaged, without having to replace the frame.

Other features that are usually added on by bolting or welding may be molded in as part of the laminating or forming process (any of wet bagging, infusion or spray in mold methods) such as light bezels 108 or license plate flats 109 or even structural features such as suspension mounting surfaces 110 for brakes. A wheel assembly 111 including a fender 112 is bolted to the frame to allow transport. Features which enhance the performance may be molded as part of the frame or added on as separate parts such as leaf, torsion springs, or rubber mounts for the wheels.

Receivers, pivot points, hinge mounts and upright sockets 115 may be molded in or added on as separate items. These types of features will be used to provide attachment points for railings, fairings, cargo and tool boxes and other desired features shown in FIGS. 3-5. All of these features combined provide for trailers which can easily be customized and transform from one purpose to another with little effort especially because the composite materials are lightweight, rust proof, and interchangeable. For example, a cargo box can be a traveling work room one day and a shed the next, while the trailer becomes a motorcycle hauler for the week-end.

Figure 3:
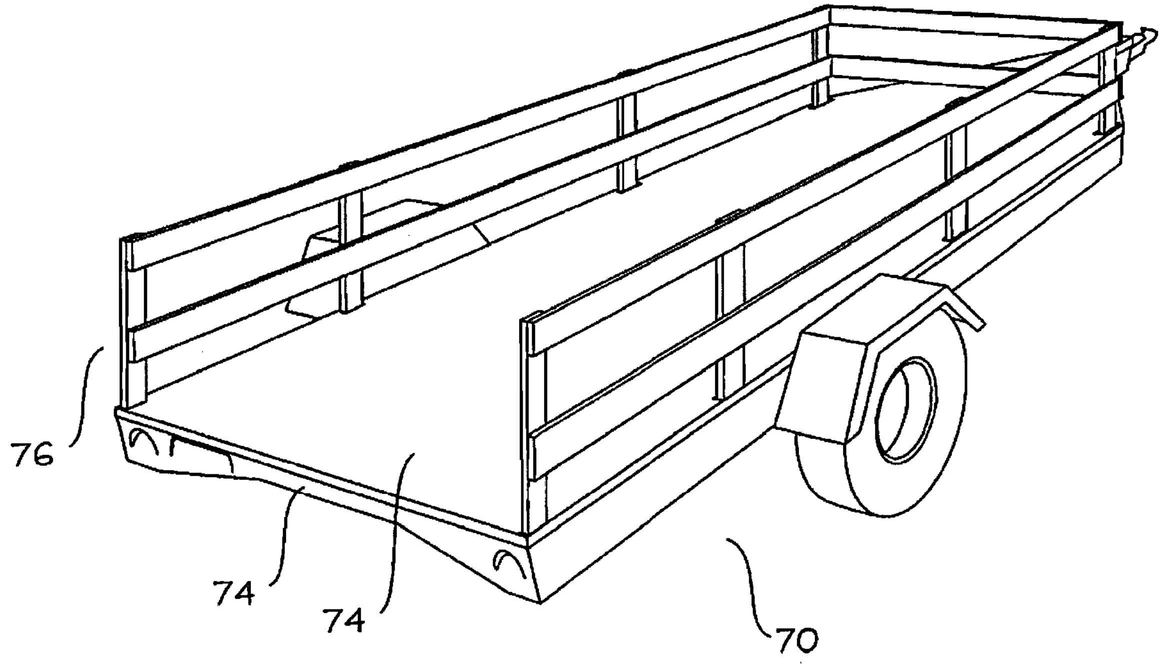
FIG. 3 is a perspective view of a composite flat bed trailer with a fence guard.
Figure 4:
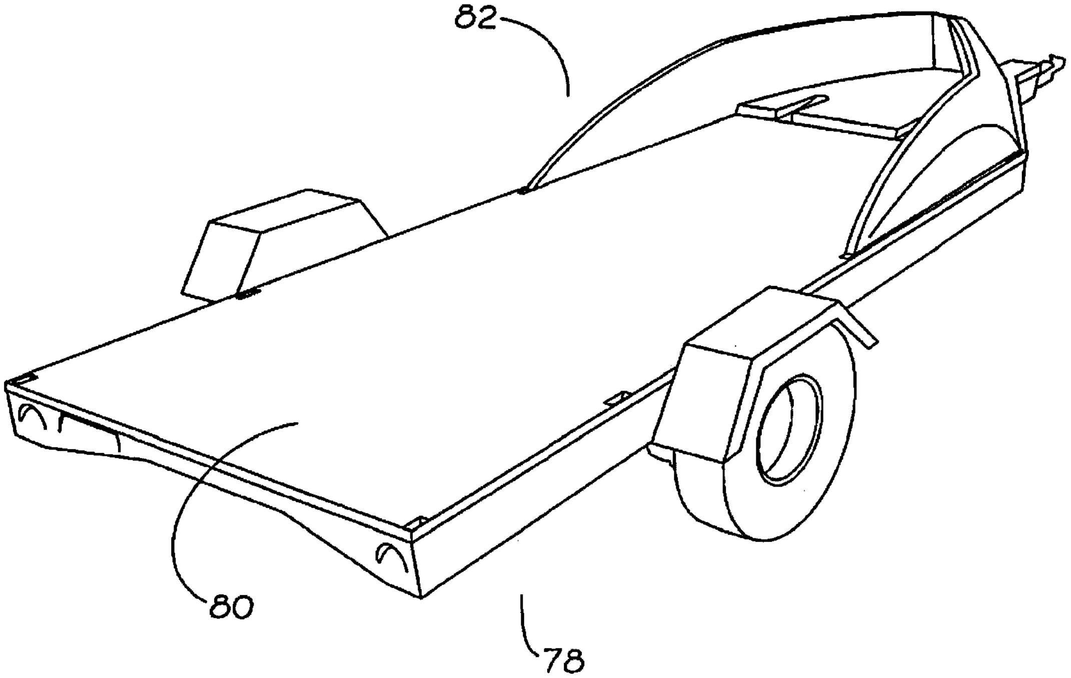
FIG. 4 is a perspective view of a composite flat bed trailer with a front shield.
Figure 5:
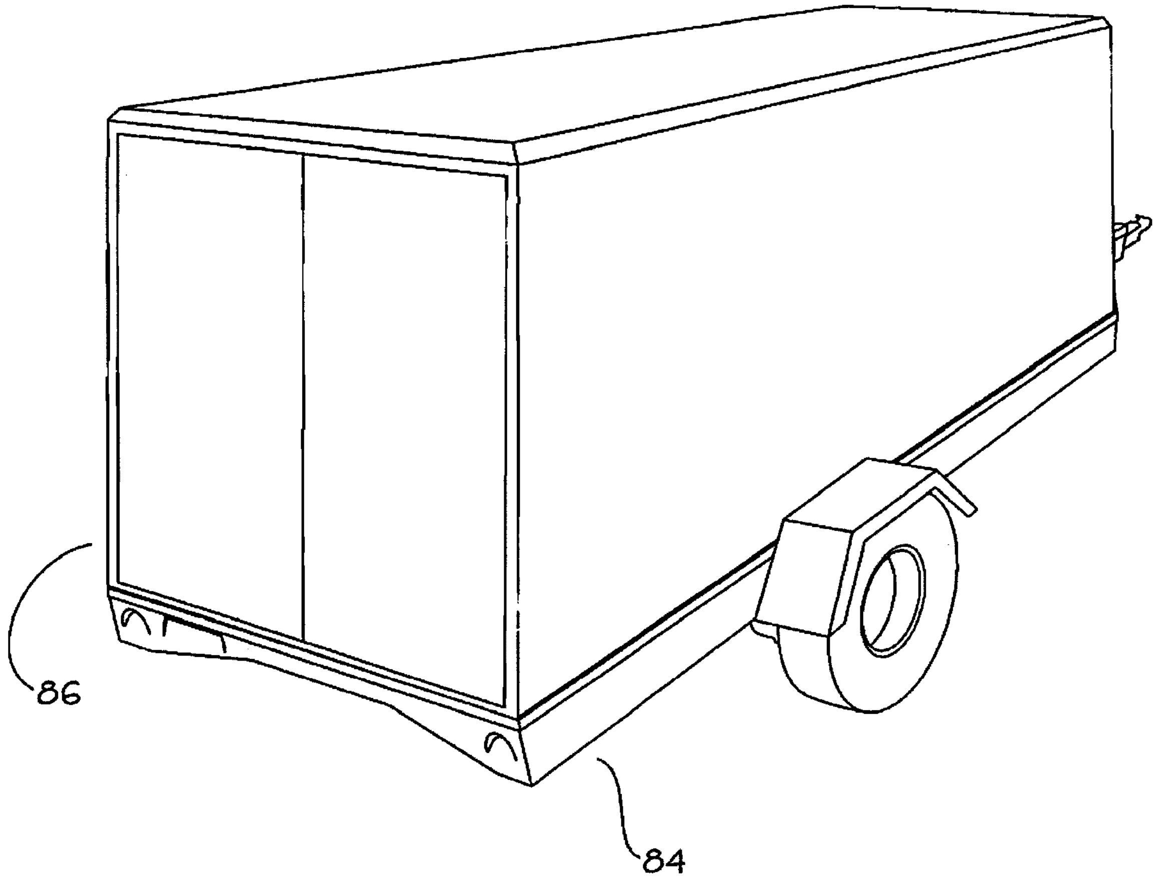
FIG. 5 is a perspective view of a composite flat bed trailer with an enclosure.
Figure 6:
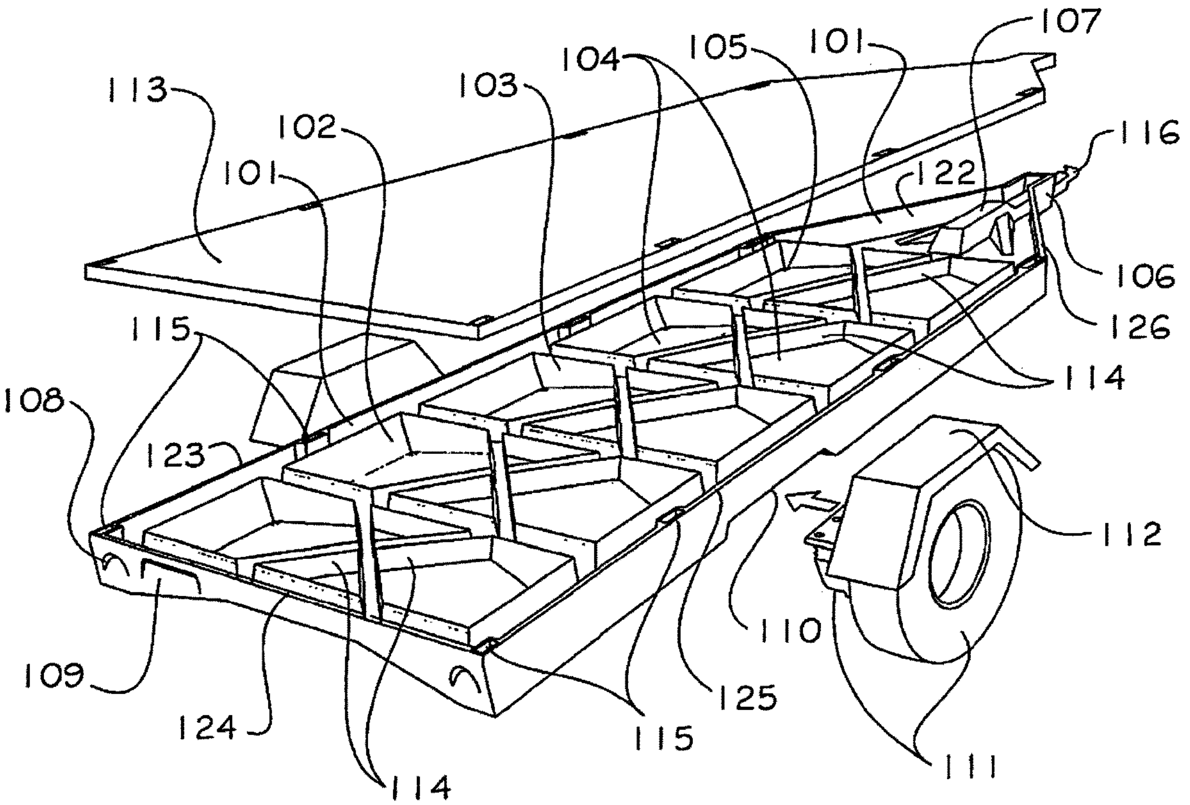
FIG. 6 is an upper perspective exploded view of the composite flat bed trailer.
Figure 7:
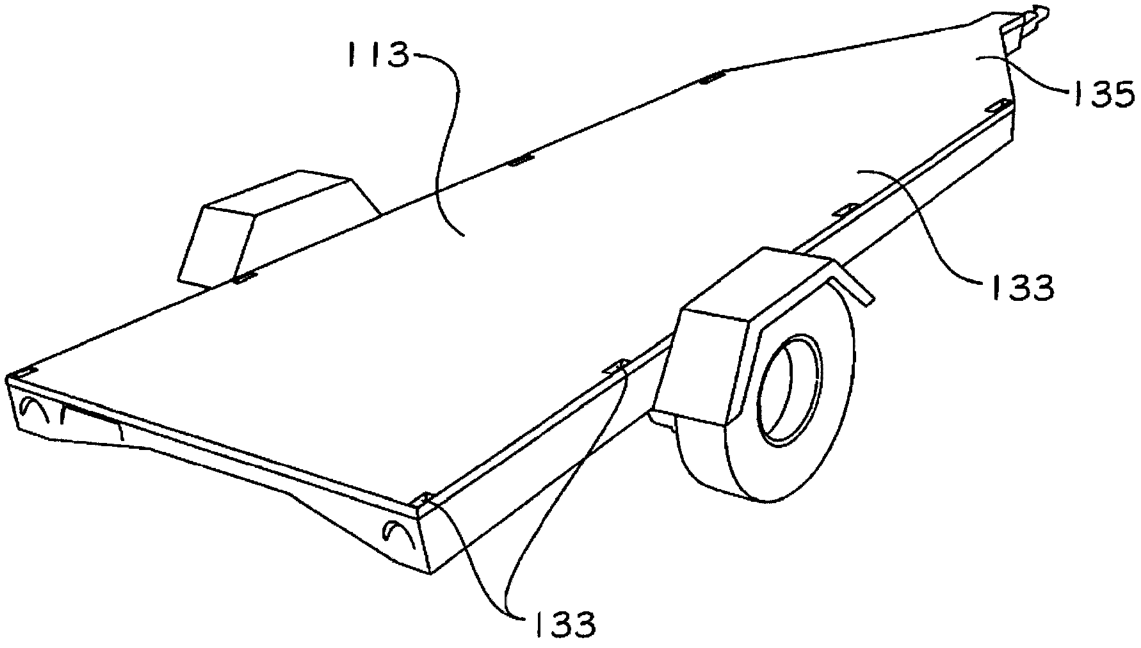
FIG. 7 is a perspective view of the composition flat bed trailer depicted in FIG. 6.
Figure 8:
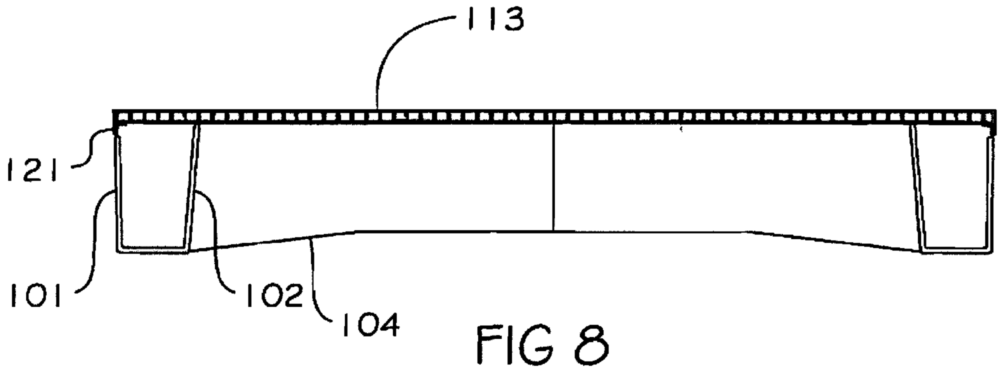
FIG. 8 is a cross sectional end view depicting the composite flat bed trailer deck.
Figure 9:
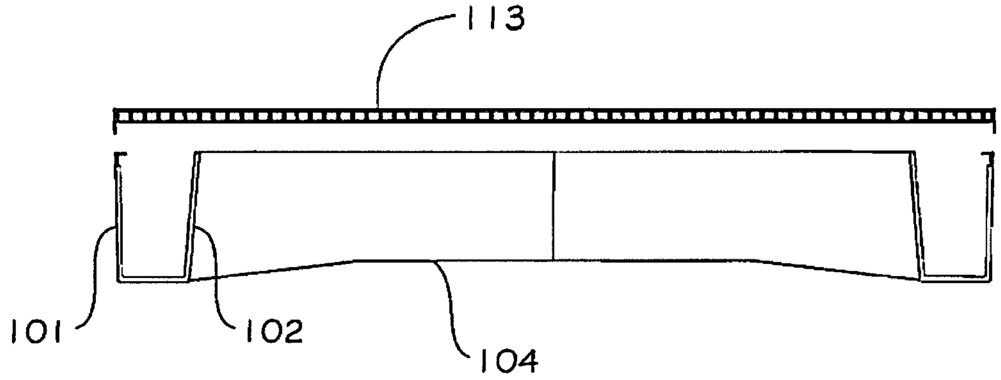
FIG. 9 is a cross sectional end view depicting the composite flat bed trailer deck in an exploded position.
Figure 10:
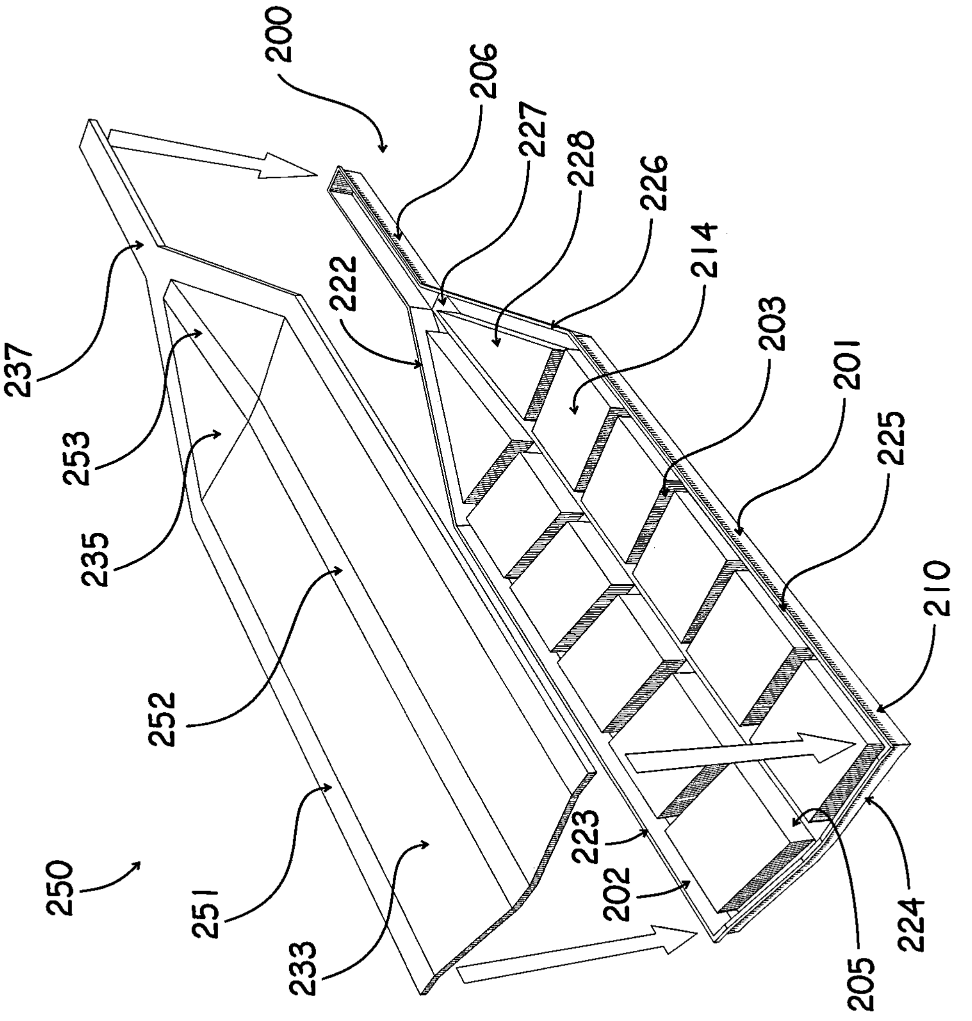
FIG. 10 is an upper perspective exploded view of a one-piece composite frame with a cap.
Figure 11:
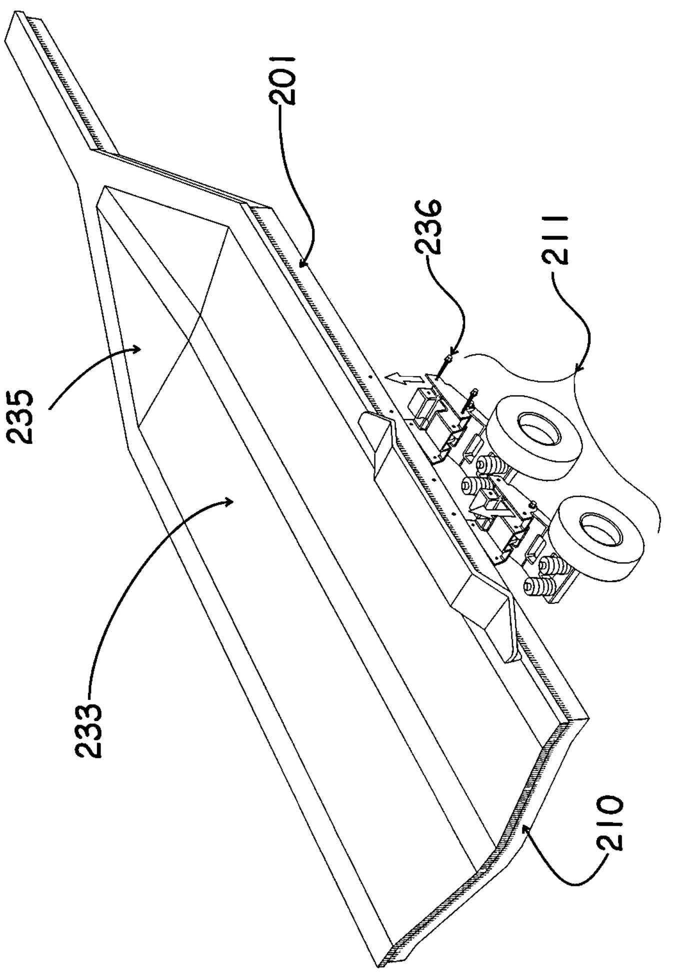
FIG. 11 is a perspective view of the one-piece composite frame with a wheel assembly.
Figure 12:
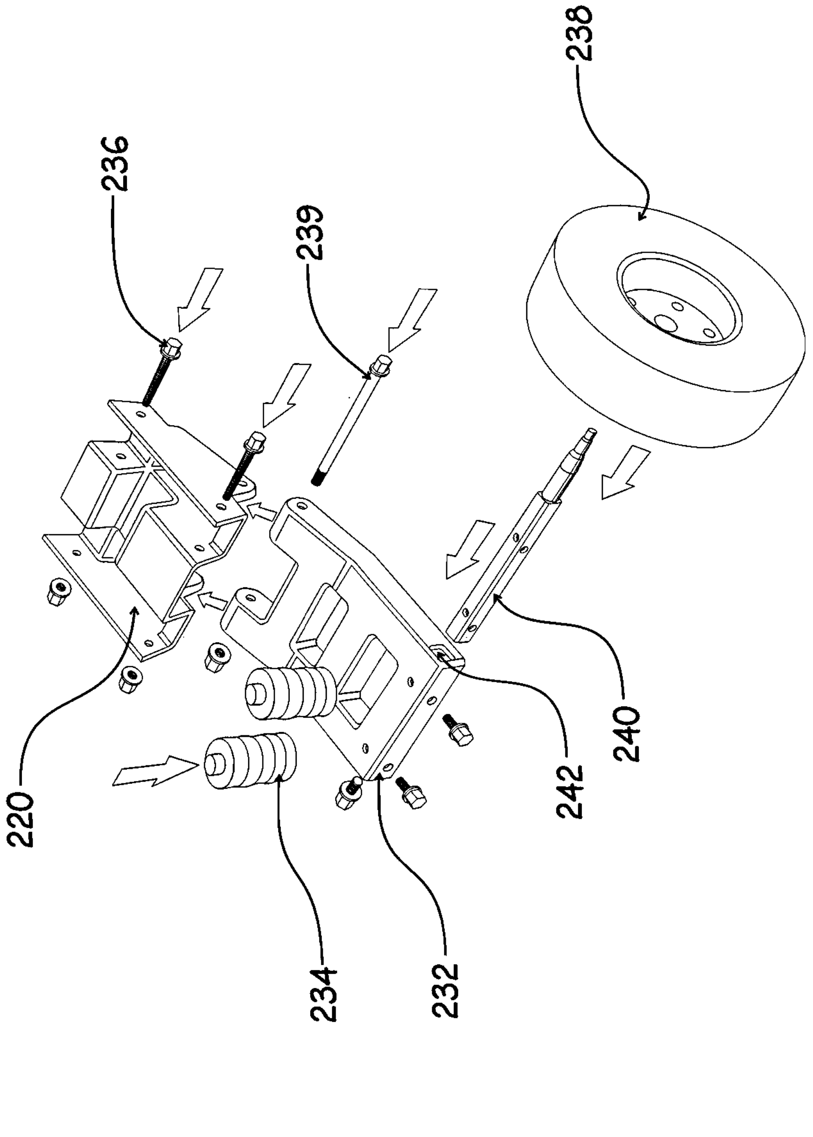
FIG. 12 is a perspective exploded view of the wheel assembly.

FIG. 3 is a perspective view of a composite flat bed trailer 70 having a flat deck 72 having a composite frame 74 with a fence guard 76. FIG. 4 is a perspective view of a composite flat bed trailer 78 having a flat deck 80 with a front shield 82 secured to the top of the towing section. FIG. 5 is a perspective view of a composite flat bed trailer 84 with an enclosure 86.

Now referring to FIGS. 10-16, while the instant invention can be made with the methods described above, in another embodiment the frame is assembled by a cap constructed and arranged to be attached to the frame with a cord having a thickness therebetween whereby forming a monocoque or one-piece composite frame. This method allows for a varied thickness of the cord in order to compensate for the weight and construction of different sized boats. Further, the alternative embodiment includes a runner made of solid plastic with the ability to rotate around a cylindrical axis to adjust to the shape of a boat's hull, known as "deadrise", as it is loaded onto the trailer. The runner may be molded into the frame or fastened directly to the frame with bunk fasteners and the runner is further adjusted to allow movement around the cylindrical axis by loosening a plurality of runner fasteners spanning throughout the runner.

The frame 200 constructed of polymer is formed from a continuous outer wall 201 spaced apart from an inner wall 202 by a bottom wall 210 forming a U-shaped front left beam 222, a side left beam 223, a rear beam 224, and right beam 225, and a U-shaped front right beam 226. In a preferred embodiment, the bottom wall 210 is curved in shape, albeit the shape and size of the bottom wall 210 is not limiting. The left beam 223, rear beam 224, and right beam 225 form a substantially rectangular section 233 formed integral with the front left beam 222 and front right beam 226 which form the triangular shaped towing section 235. The rectangular section 233 and the triangular shaped towing section 235 apply to both the frame 200 and a cap 250 that is constructed and arranged to be attached to the frame 200.

Within the inner wall 202 of the frame 200 is a plurality of rectangular support members 214 defined by lateral walls 203 and longitudinal walls 205 that are substantially rectangular in shape within the section 233 as well as a plurality of triangular support members 228 defined by side walls 230 that are substantially triangular in shape within the section 235. The lateral walls 203, the longitudinal walls 205, and the side walls 230 may have a varying radii along the length of the beam. The support members 214, 228 are designed, sized, and shaped to accommodate the shape and size of the cap 250 constructed and arranged to be attached to the frame 200. The term "substantially" relates to the support members 214, 228 being within manufacturing tolerances known in the art to create rectangular and triangular support members.

The cap 250 has a continuous sidewall 251 and includes a channel beam 252 extending the length of the rectangular section 233 and later transitions along the front section through to the triangular shaped section 235. A transition beam 253 continues from the channel beam 252 and extends throughout into a towing section 235. When the cap 250 is attached to the frame, the channel beam 252 and the transition beam 253 are seated between the support members 214, 228, respectively. The cap 250 is constructed and arranged to be attached to the frame 200. The frame 200 further includes a towing point 206 extending from an intersection 227 of the U-shaped front left beam 222 and the U-shaped front right beam 226. The towing point 206 may be fixed or hinged at the extension point to reduce the trailer's overall length. The cap 250 includes a towing beam 237 extending from the transition beam 253 that is shaped and sized to be attached to the towing point 206 of the frame 200.

Additionally, other features may be added to the frame 200 by bolting or adhering the features. Features are not limiting and may include a wheel assembly 211 having fenders, suspension, and brakes to allow transport. Features which enhance the performance may be molded as part of the frame or added on as separate parts such as leaf, torsion springs, or rubber mounts for the wheels. In a preferred embodiment, the wheel assembly 211 includes an upper suspension mounting bracket 220 and a lower suspension mounting bracket 232 with a suspension system 234 therebetween. The manner of the suspension system 234 is not limiting and may be leaf springs, torsion springs, rubber mounts, or foam cell springs. The upper 220 and lower suspension mounting brackets 232 may be bolted to the frame 200 using bolts 236 and pins 239 preferably manufactured of a composite material that prevents corrosion and rust. Lastly, the wheel assembly 211 includes a plurality of wheels 238 secured to the lower suspension mounting bracket 232 via axles 240 that are slidably secured into an aperture 242 of the lower suspension mounting bracket 232.

Figures 13, 14, 15, 16:
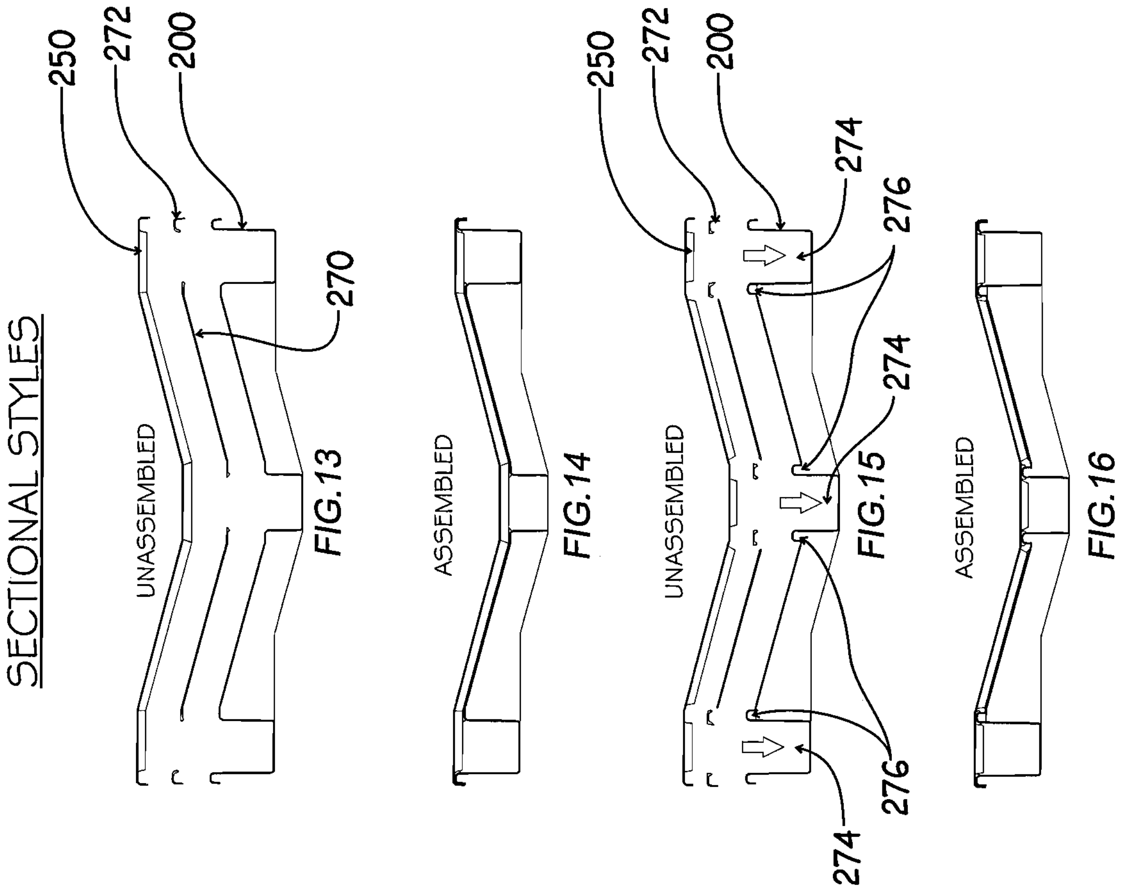
FIG. 13 is a cross sectional end view depicting the one-piece composite frame in an exploded position.
FIG. 14 is a cross sectional end view depicting the one-piece composite frame.
FIG. 15 is a cross sectional end view depicting another embodiment of the one-piece composite frame in an exploded position.
FIG. 16 is a cross sectional end view depicting another embodiment of the one-piece composite frame.

Now referring to FIGS. 13-16, sectional views of the assembly of a one-piece composite frame are shown. The one-piece frame is assembled by a cap 250 constructed and arranged to be attached to the frame 200 with a cord 270 having a thickness therebetween whereby forming a monocoque or one-piece composite frame, as shown in an unassembled state in FIG. 13. As the one-piece composite frame is being assembled, the thickness of the cord 270 may vary based on the weight and construction of different sized boats. Larger boats would require a cord 270 to have a greater thickness to reinforce the one-piece frame. During assembly, the one-piece composite frame includes lips 272 that seat and seal the edges of the frame 200 and the cap 250 together, as shown in FIG. 14.

FIGS. 15 and 16 show the assembly of a one-piece composite frame that may accommodate for different boat constructions. In this embodiment, the seating of the cap 250 prevents lateral movement since the cap 250 is seated in between channels 274 and the lips 272 are placed over reinforcements 276 on the frame 200 when fully assembled, as shown in FIG. 16. The seating of the cap 250 also allows for adding attachment features and securing items to the trailer via strapping. The cord 270 may also vary in thickness in this embodiment depending on the construction and weight of the boat.

Figure 17:
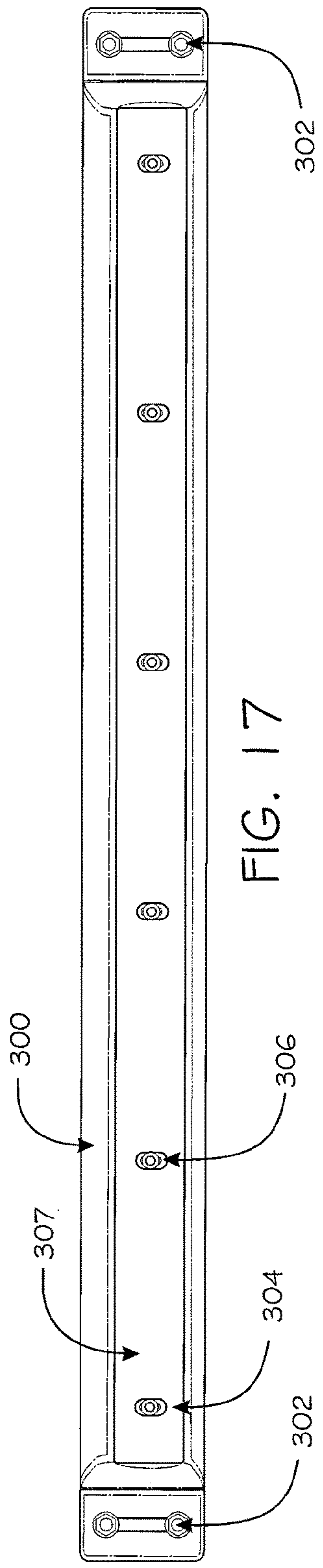
FIG. 17 is a top view of a runner.
Figure 18:
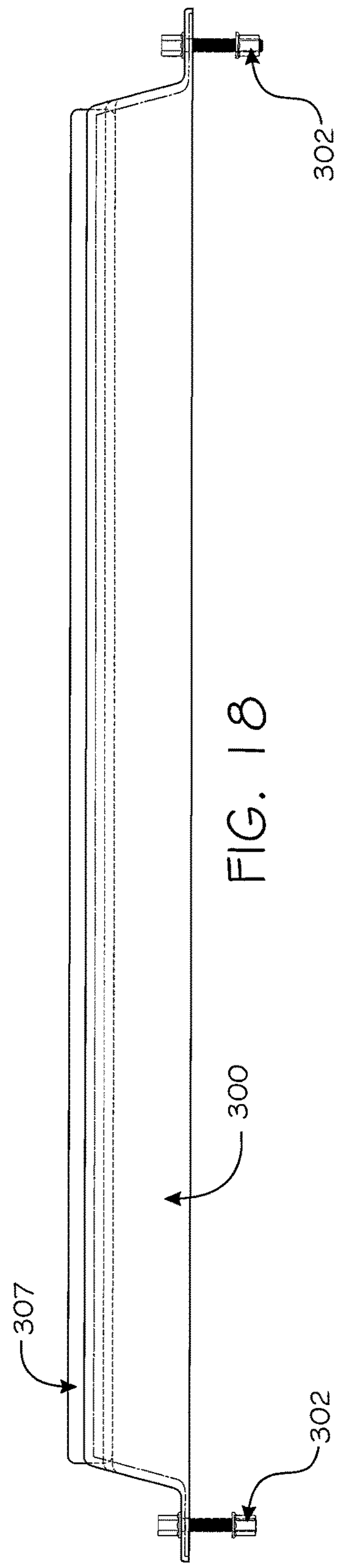
FIG. 18 is a side view of the runner.
Figure 19:
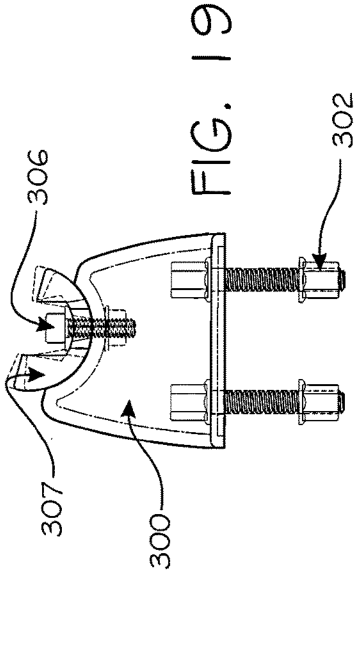
FIG. 19 is a cross sectional view of the runner.

Now referring to FIGS. 17-19, the one-piece composite frame includes a runner 300 made of solid plastic with the ability to rotate around a cylindrical axis to adjust to the shape of a boat's hull. The runner 300 itself is fastened to the frame 200 with bunk fasteners 302 or may be molded into the frame. The bunk fasteners 302 are preferably manufactured of a composite material that prevents corrosion and rust. Along the runner 300 are a plurality of slots 304 that allow for movement around the cylindrical axis. Within the slots 304 are runner fasteners 306 that are able to be loosened in order to allow the runner 300 to freely rotate. When loosened, a user can further adjust the angle of the runner 300 to the desired position and then tighten the runner fasteners 306 once more in order to secure the runner 300 in place for repeated uses. This design allows for the full adjustability of different size and shape boats to fit onto one particular trailer.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

While this specification sets forth a boat trailer as a primary embodiment, it will be obvious to one skilled in the art that the trailer disclosed herein can be adapted for car haulers, ATV trailers, pool cleaner trailers, motorcycle trailers, lawnmower trailers, personal watercraft trailers, flatbed trailers, box trailers, horse trailers, tractor trailers, heavy equipment trailers, expandable trailers, dump trailers, airplane trailers, canoe trailers, livestock trailers, agricultural trailers, pop-up trailers, pickup bed campers, snow mobile trailers, RV and coach chassis/body assemblies.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A trailer comprising:

a frame constructed of polymer, said frame having a continuous outer wall spaced apart from an inner wall by a bottom wall forming a U-shaped front left beam, a side left beam, a rear beam, and right beam, and a U-shaped front right beam; a substantially rectangular section defined by said left beam, said rear beam, and said right beam formed integral with a triangular shaped towing section defined by said front left beam and said front right beam; a plurality of rectangular support members defined by lateral walls and longitudinal walls within said rectangular section; a plurality of triangular support members defined by side walls within said triangular shaped towing section;

a wheel assembly secured to said frame;

a cap having a continuous sidewall constructed and arranged to be attached to said frame having a channel beam extending the length of said rectangular section and a transition beam extending the length of said triangular shaped towing section, wherein said channel beam is seated between said rectangular support members and said triangular support members; and a cord having a thickness therebetween said frame and said cap whereby forming a monocoque or one-piece composite frame when assembled.

2. The trailer according to claim 1 wherein said bottom wall is curved in shape.

3. The trailer according to claim 1 wherein said lateral walls and longitudinal walls are substantially rectangular in shape.

4. The trailer according to claim 1 wherein said side walls are substantially triangular in shape.

5. The trailer according to claim 1 wherein said rectangular support members and said triangular support members are sized and shaped to accommodate the size and shape of said cap.

6. The trailer according to claim 1 wherein said frame further includes a towing point extending from an intersection of said U-shaped front left beam and said U-shaped front right beam.

7. The trailer according to claim 1 wherein said wheel assembly is attached to said frame having an upper suspension mounting bracket and a lower suspension mounting bracket with a suspension system therebetween.

8. The trailer according to claim 7 wherein said suspension system is selected from a group consisting of leaf springs, torsion springs, rubber mounts, or foam cell springs.

9. The trailer according to claim 7 wherein said wheels of said wheel assembly are secured to said lower suspension mounting bracket via axles, said axles are slidably secured into an aperture of said lower suspension mounting bracket.

10. The trailer according to claim 1 wherein lips seat and seal the edges of said frame and said cap together.

11. The trailer according to claim 1 wherein said frame includes channels and reinforcements constructed and arranged to seat lips therebetween said cap and said frame whereby the seating of said cap prevents lateral movement and adds for attachment features and securing items to the trailer via strapping.

12. A boat trailer comprising:

a frame constructed of polymer, said frame having a continuous outer wall spaced apart from an inner wall by a bottom wall forming a U-shaped front left beam, a side left beam, a rear beam, and right beam, and a U-shaped front right beam; a substantially rectangular section defined by said left beam, said rear beam, and said right beam formed integral with a triangular shaped towing section defined by said front left beam and said front right beam; a plurality of rectangular support members defined by lateral walls and longitudinal walls within said rectangular section; a plurality of triangular support members defined by side walls within said triangular shaped towing section;

a wheel assembly secured to said frame;

a cap having a continuous sidewall constructed and arranged to be attached to said frame having a channel beam extending the length of said rectangular section and a transition beam extending the length of said triangular shaped towing section, wherein said channel beam is seated between said rectangular support members and said triangular support members;

a cord having a thickness therebetween said frame and said cap whereby forming a monocoque or one-piece composite frame when assembled; and a pair of bunks having a plurality of slots with runner fasteners disposed within, each said bunk secured to said frame, wherein said runner has the ability to rotate around a cylindrical axis of said bunk when said fasteners are loosened to adjust to the shape of a boat's hull.

13. The boat trailer according to claim 12 wherein said bunk is constructed from a composite material.

14. The boat trailer according to claim 12 wherein said wheel assembly is attached to said frame having an upper suspension mounting bracket and a lower suspension mounting bracket with a suspension system therebetween.

15. The boat trailer according to claim 12 wherein said suspension system is selected from a group consisting of leaf springs, torsion springs, rubber mounts, or foam cell springs.

16. The boat trailer according to claim 7 wherein wheels of said wheel assembly are secured to said lower suspension mounting bracket via axles, said axles are slidably secured into an aperture of said lower suspension mounting bracket.

17. The trailer according to claim 12 wherein said bunk fasteners are manufactured of a composite material.

* * * * *